United States Patent
Pedigo

(10) Patent No.: US 10,040,547 B1
(45) Date of Patent: Aug. 7, 2018

(54) UNMANNED AERIAL VEHICLE

(71) Applicant: Samuel Pedigo, Monroe, LA (US)

(72) Inventor: Samuel Pedigo, Monroe, LA (US)

( * ) Notice: Subject to any disclaimer, the term of this patent is extended or adjusted under 35 U.S.C. 154(b) by 89 days.

(21) Appl. No.: 14/944,418

(22) Filed: Nov. 18, 2015

(51) Int. Cl.
| | |
|---|---|
| B64C 29/00 | (2006.01) |
| B64C 25/52 | (2006.01) |
| B64C 39/10 | (2006.01) |
| B64D 47/08 | (2006.01) |
| B64C 39/02 | (2006.01) |
| B64C 27/26 | (2006.01) |
| B64C 25/32 | (2006.01) |

(52) U.S. Cl.
CPC .......... B64C 29/0016 (2013.01); B64C 25/32 (2013.01); B64C 25/52 (2013.01); B64C 27/26 (2013.01); B64C 29/005 (2013.01); B64C 29/0025 (2013.01); B64C 29/0066 (2013.01); B64C 39/024 (2013.01); B64D 47/08 (2013.01); B64C 39/10 (2013.01); B64C 2201/021 (2013.01); B64C 2201/088 (2013.01); B64C 2201/127 (2013.01)

(58) Field of Classification Search
CPC ............ B64C 29/0066; B64C 29/0025; B64C 29/005; B64C 29/0016; B64C 29/0041; B64C 25/52; B64C 39/10; B64C 2039/105; B64C 2201/028; B64C 2201/088; B64C 2201/127; B64D 47/08
See application file for complete search history.

(56) References Cited

U.S. PATENT DOCUMENTS

| | | | | |
|---|---|---|---|---|
| 2,461,435 A | * | 2/1949 | Neumann ........... | B64C 29/0025 244/12.5 |
| 2,968,453 A | | 1/1961 | Bright | |
| 3,045,951 A | * | 7/1962 | Freeland ............. | B64C 29/0025 180/117 |
| 3,752,417 A | * | 8/1973 | Lagace ................ | B64C 29/0025 244/12.1 |
| 4,474,345 A | * | 10/1984 | Musgrove ........... | B64C 29/0066 244/12.5 |
| 4,685,641 A | * | 8/1987 | Kirsch .................... | B64C 25/52 114/272 |
| 5,497,960 A | * | 3/1996 | Previnaire .............. | B64D 47/08 244/118.1 |

(Continued)

*Primary Examiner* — Richard R Green
(74) *Attorney, Agent, or Firm* — R. Keith Harrison

(57) ABSTRACT

An unmanned aerial vehicle includes a vehicle body and a vehicle wing on the vehicle body. A front motor assembly is provided in the vehicle body and the vehicle wing. A front vertical air discharge pathway and a front horizontal air discharge pathway communicate with the front motor assembly. A front air diverter is disposed between a retracted position unblocking the front vertical air discharge pathway to impart vertical lift to the vehicle and an extended position blocking the front vertical air discharge pathway to impart horizontal thrust to the vehicle. A pair of rear motor assemblies is provided in the vehicle wing and each includes a rear vertical air discharge pathway and a rear horizontal air discharge pathway communicating with the rear motor assembly. A rear air diverter is disposed between a retracted position unblocking the rear vertical air discharge pathway to impart vertical lift to the vehicle and an extended position blocking the rear vertical air discharge pathway to impart horizontal thrust to the vehicle.

20 Claims, 16 Drawing Sheets

(56) References Cited

U.S. PATENT DOCUMENTS

| | | | |
|---|---|---|---|
| 5,505,407 A | | 4/1996 | Chiappetta |
| 5,645,250 A | * | 7/1997 | Gevers .................... B64C 25/52 |
| | | | 244/101 |
| 5,890,441 A | | 4/1999 | Swinson et al. |
| 6,170,778 B1 | | 1/2001 | Cycon et al. |
| 6,547,180 B1 | * | 4/2003 | Cassidy .............. B64C 29/0025 |
| | | | 244/12.5 |
| 6,568,630 B2 | | 5/2003 | Yoeli |
| 6,568,635 B2 | | 5/2003 | Carpenter |
| 6,742,741 B1 | | 6/2004 | Rivoli |
| 6,843,447 B2 | | 1/2005 | Morgan |
| 7,281,680 B2 | | 10/2007 | Melkuti |
| 7,410,122 B2 | | 8/2008 | Robbins et al. |
| 7,857,254 B2 | | 12/2010 | Parks |
| 8,317,126 B2 | | 11/2012 | Harris et al. |
| 8,408,489 B2 | | 4/2013 | Gosling |
| 8,960,594 B2 | * | 2/2015 | Groen ....................... B64C 9/00 |
| | | | 244/17.11 |
| 9,085,355 B2 | | 7/2015 | DeLorean |
| 9,688,396 B2 | * | 6/2017 | Avery, III ........... B64C 29/0025 |
| 2007/0246601 A1 | * | 10/2007 | Layton ................ B64C 29/0025 |
| | | | 244/12.2 |
| 2014/0103158 A1 | | 4/2014 | Berry |
| 2016/0117853 A1 | * | 4/2016 | Zhong .................... B64D 47/08 |
| | | | 345/634 |
| 2017/0152060 A1 | * | 6/2017 | Morisawa .............. B64D 47/08 |

\* cited by examiner

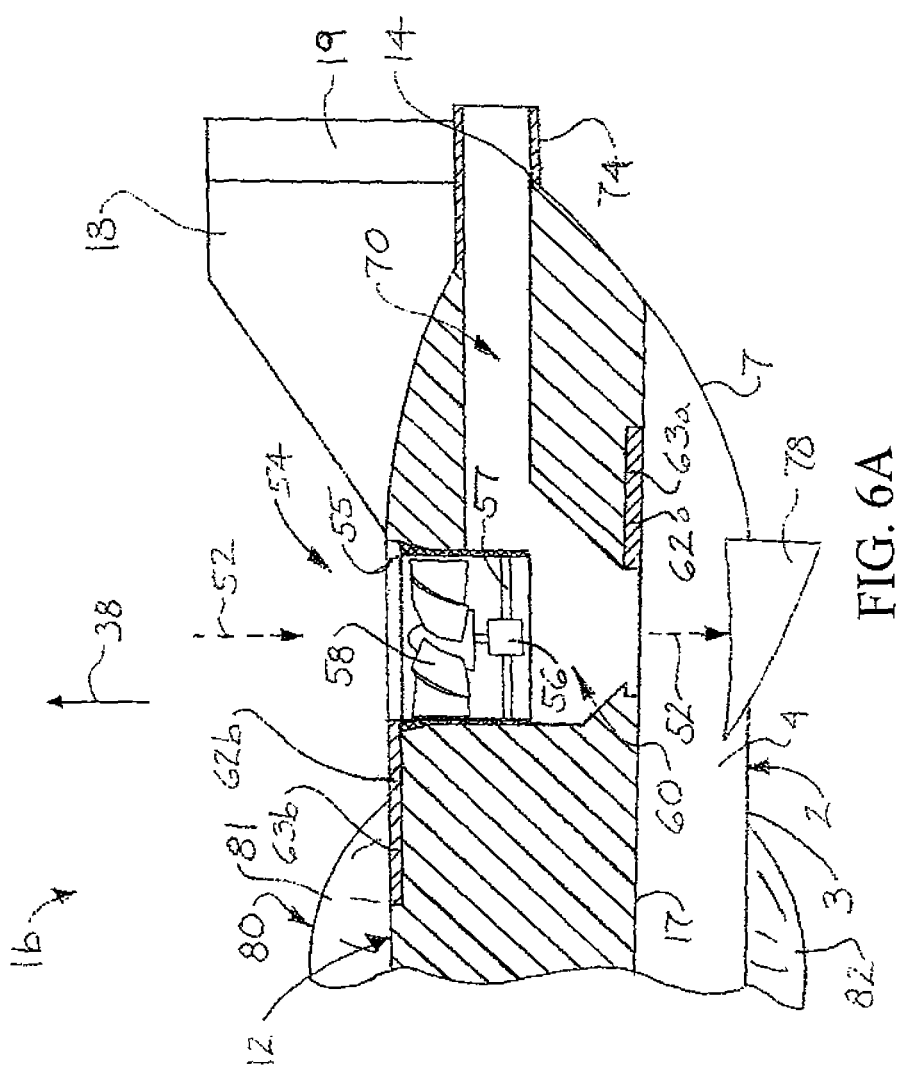

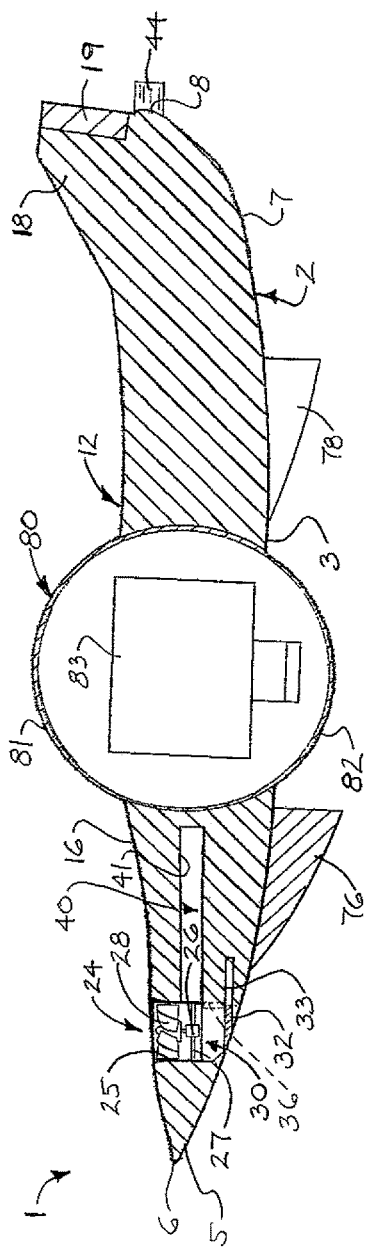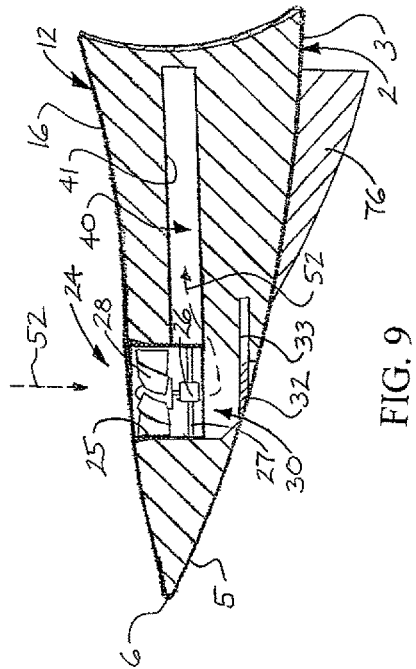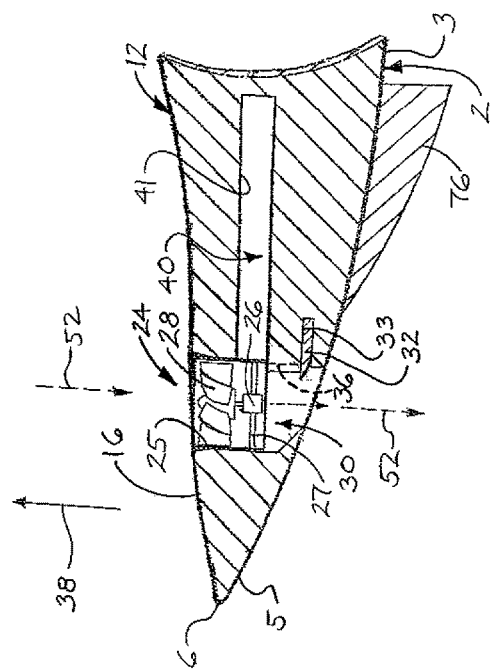
FIG. 7
FIG. 8
FIG. 9

UNMANNED AERIAL VEHICLE

FIELD

Illustrative embodiments of the disclosure generally relate to unmanned aerial vehicles. More particularly, illustrative embodiments of the disclosure relate to an unmanned aerial vehicle which is capable of taking off vertically and gliding from cruise altitude back to the ground.

SUMMARY

Illustrative embodiments of the disclosure are generally directed to an unmanned aerial vehicle which is capable of taking off vertically and gliding from cruise altitude back to the ground. The unmanned aerial vehicle may include a vehicle body and a vehicle wing on the vehicle body. A front motor assembly maybe provided in the vehicle body and the vehicle wing. A front vertical air discharge pathway and a front horizontal air discharge pathway may communicate with the front motor assembly. A front air diverter may be disposed between a retracted position unblocking the front vertical air discharge pathway to impart vertical lift to the vehicle and an extended position blocking the front vertical air discharge pathway to impart horizontal thrust to the vehicle. A pair of rear motor assemblies may be provided in the vehicle wing. Each rear motor assembly may include a rear vertical air discharge pathway and a rear horizontal air discharge pathway communicating with the rear motor assembly. A rear air diverter may be disposed between a retracted position unblocking the rear vertical air discharge pathway to impart vertical lift to the vehicle and an extended position blocking the rear vertical air discharge pathway to impart horizontal thrust to the vehicle.

BRIEF DESCRIPTION OF THE DRAWINGS

Illustrative embodiments of the disclosure will now be described, by way of example, with reference to the accompanied drawings, wherein:

FIG. 6A is an enlarged sectional view of the rear portion of an alternative illustrative embodiment of the unmanned aerial vehicle, more particularly illustrating a lower rear air diverter and an upper rear air diverter in an open position for upward thrust and vertical takeoff of the unmanned aerial vehicle;

FIG. 7 is a longitudinal sectional view, taken along section lines 7-7 in FIG. 2;

FIG. 8 is an enlarged sectional view of a front portion of the unmanned aerial vehicle illustrated in FIG. 7, more particularly illustrating structural details of a front motor assembly and front vertical and horizontal air discharge pathways, more particularly illustrating air flowing through the front vertical air discharge pathway for upward thrust and vertical takeoff of the vehicle;

FIG. 9 is an enlarged sectional view of the front portion of the unmanned aerial vehicle illustrated in FIG. 7, with the air flowing through the front horizontal air discharge pathway for forward thrust and horizontal flight of the vehicle;

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is non-limiting and is not necessarily to be construed as preferred or advantageous over other implementations. All of the implementations described below are exemplary implementations provided to enable persons skilled in the art to practice the disclosure and are not intended to limit the scope of the appended claims. Moreover, the illustrative embodiments described herein are not exhaustive and embodiments or implementations other than those which are described herein and which fall within the scope of the appended claims are possible. Furthermore, there is no intention to be bound by any expressed or implied theory presented in the preceding technical field, background, brief summary or the following detailed description. Relative terms such as "upper", "lower", "above", "below", "top", "horizontal" and "vertical" as used herein are intended for descriptive purposes only and are not necessarily intended to be construed in a limiting sense.

Figure 3:
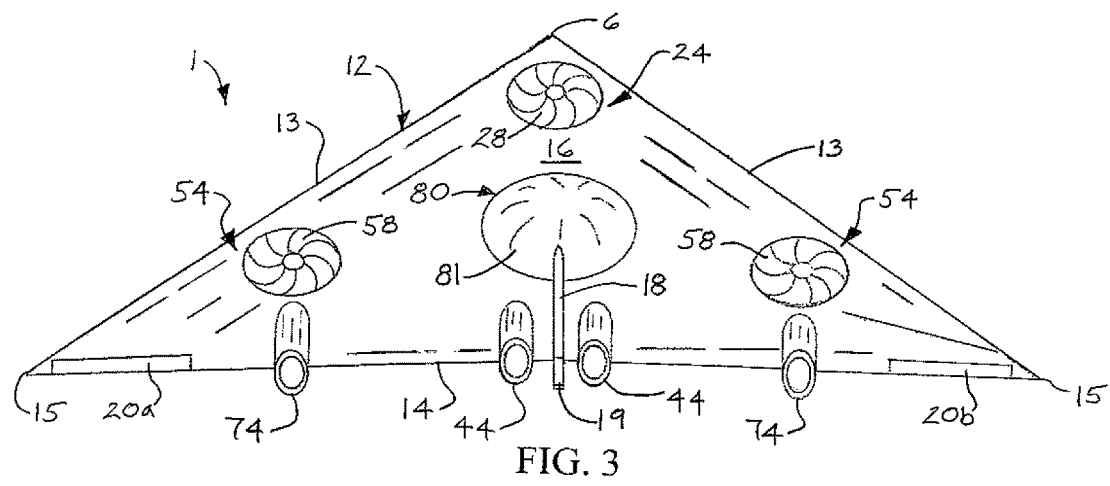
FIG. 3 is a rear perspective view of an illustrative embodiment of an unmanned aerial vehicle having flat wing tips.
Figure 4:
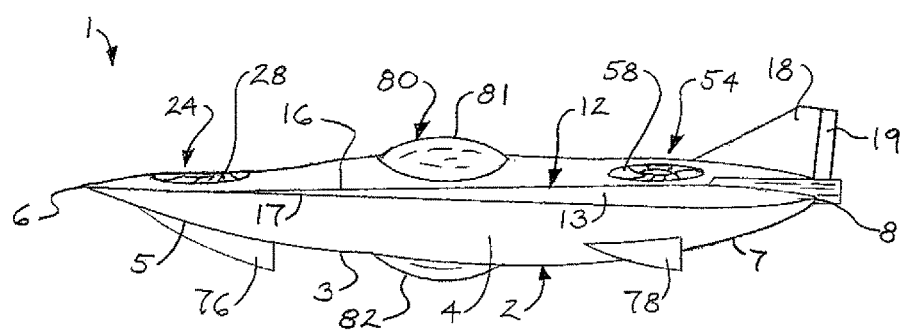
FIG. 4 is a left side view of the unmanned aerial vehicle illustrated in FIG. 3.

Referring initially to FIGS. 1-13 of the drawings, an illustrative embodiment of the unmanned aerial vehicle is generally indicated by reference numeral 1. As illustrated in FIG. 4, the unmanned aerial vehicle 1 may include a vehicle body 2. The vehicle body 2 may have a ventral body surface 3, side body surfaces 4 which extend outwardly from the ventral body surface 3 and a front body surface 5 and a rear body surface 7 which extend forwardly and rearwardly, respectively, from the ventral body surface 3. The side body surfaces 4 and the front body surface 5 may terminate forwardly in a nose 6. The side body surfaces 4 and the rear body surface 7 may terminate rearwardly in a tail 8.

Figure 1:
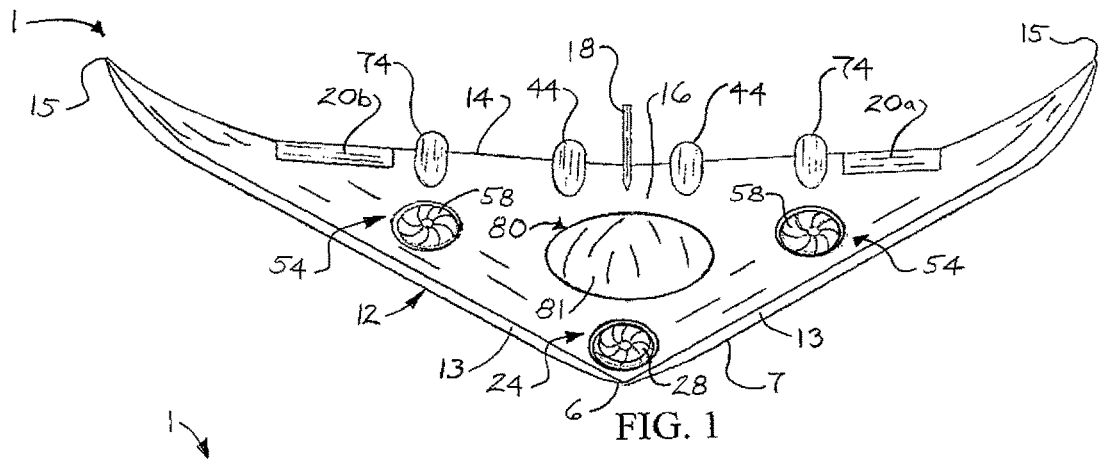
FIG. 1 is a front perspective view of an illustrative embodiment of the unmanned aerial vehicle having upwardly-curved wing tips.
Figure 2:
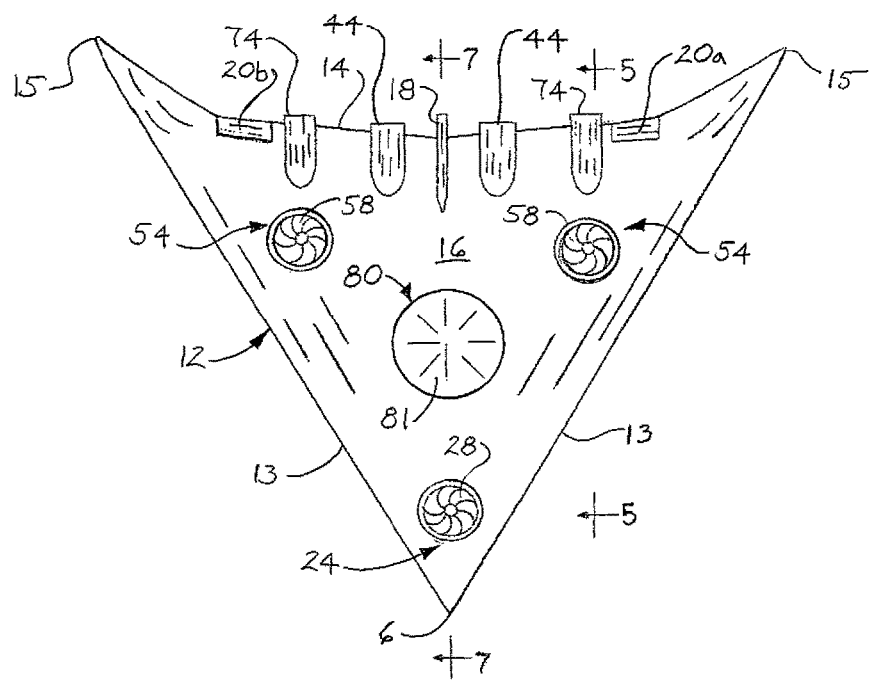
FIG. 2 is a top view of the illustrative unmanned aerial vehicle illustrated in FIG. 1.

A vehicle wing 12 may extend outwardly from the vehicle body 2. As illustrated in FIGS. 1-3, in some embodiments, the vehicle wing 12 may have a generally diamond-shaped or triangular-shaped configuration and may resemble a delta wing configuration. The vehicle wing 12 may include a pair of side wing edges 13 which diverge rearwardly from the nose 6 to a pair of respective wing tips 15. A rear wing edge 14 may extend between the wing tips 15. The tail 8 (FIG. 4) of the vehicle body 2 may terminate at the middle or center of the rear wing edge 14 of the vehicle wing 12. As illustrated in FIGS. 1 and 2, in some embodiments, the wing tips 15 may curve upwardly. As illustrated in FIGS. 3 and 4, in other embodiments, the wing tips 15 may be flat and straight or coplanar with respect to the remaining portion of the vehicle wing 12. As illustrated in FIGS. 1 and 2, in some embodiments, the vehicle wing 12 may be swept back to resemble a delta wing. The vehicle wing 12 may have a dorsal wing surface 16 which may be generally planar or convex and may be bounded by the side wing edges 13 and the rear wing edge 14 of the vehicle wing 12. As illustrated in FIG. 4, the vehicle wing 12 may have a ventral wing surface 17 which is continuous with the side body surfaces 4 of the vehicle body 2. The vehicle body 2 and the vehicle wing 12 may be fabricated of a lightweight polymeric material such as expanded polystyrene (STYROFOAM®), lightweight plastic, composite material or any combination thereof, for example and without limitation. The vehicle body 2 and vehicle wing 12 may be fabricated using conventional injection molding and/or other fabrication techniques know by those skilled in the art.

A vertical stabilizer 18 may extend upwardly from the vehicle wing 12 at the midpoint of the rear wing edge 14. A rudder 19 may be provided in the vertical stabilizer 18 to facilitate left and right yawing of the unmanned aerial vehicle 1 in flight. A left aileron 20a and a right aileron 20b may be provided in the rear wing edge 14 of the vehicle wing 12 to facilitate left and right banking of the unmanned aerial vehicle 1 in flight. The left aileron 20a and the right aileron 20b may be provided at any desired location along the length of the rear wing edge 14.

A front motor assembly 24 may be provided in the front portion of the vehicle wing 12 and vehicle body 2. As illustrated in FIGS. 7-9, the front motor assembly 24 may include a front motor opening 25 which extends into the dorsal wing surface 16 of the vehicle wing 12. A front fan motor 26 may be mounted in the front motor opening 25 typically via motor supports 27. The front fan motor 26 drivingly engages a ducted front fan 28 for rotation of the front fan 28 in the front motor opening 25.

Figure 10:
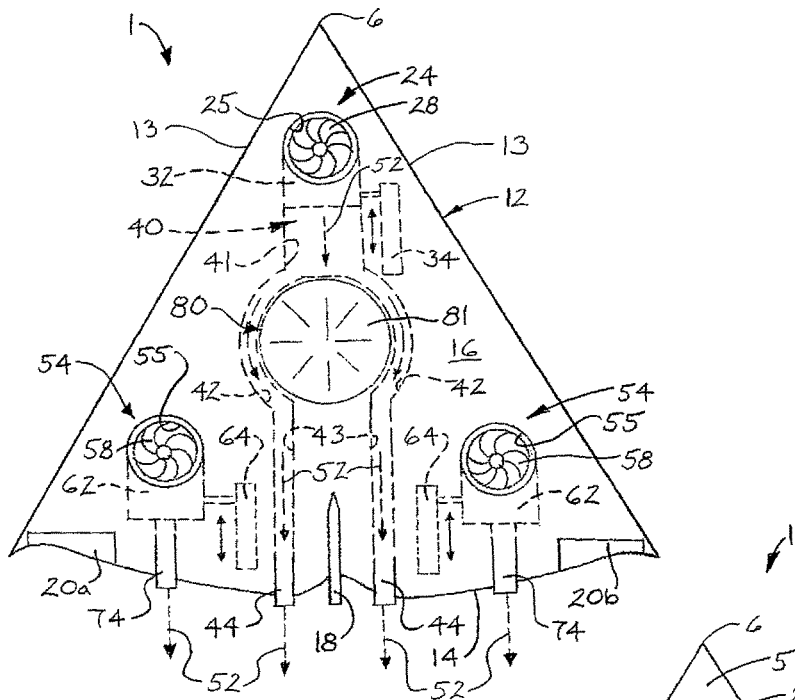
FIG. 10 is a top view of an illustrative embodiment of the unmanned aerial vehicle, more particularly illustrating the front horizontal air discharge pathway, the rear horizontal air discharge pathways, front and rear air diverters and diverter motors engaging the respective front and rear air diverters to slidably displace each air diverter between the air diverting configurations.

A front vertical air discharge pathway 30 may be provided in the vehicle body 2 in pneumatic communication with the front motor opening 25. The front vertical air discharge pathway 30 may discharge or open to the front body surface 5 of the vehicle body 2. A front horizontal air discharge pathway 40 may be disposed in pneumatic communication with the front vertical air discharge pathway 30. As illustrated in FIG. 10, in some embodiments, the front horizontal air discharge pathway 40 may include a front pathway segment 41 which communicates with the front vertical air discharge pathway 30, a pair of side pathway segments 42 which extend from the front pathway segment 41 and a pair of rear pathway segments 43 which extend from the respective side pathway segments 42. In some embodiments, the side pathway segments 42 may curve outwardly between the front pathway segment 41 and the rear pathway segments 43 for purposes which will be hereinafter described.

Figure 12:
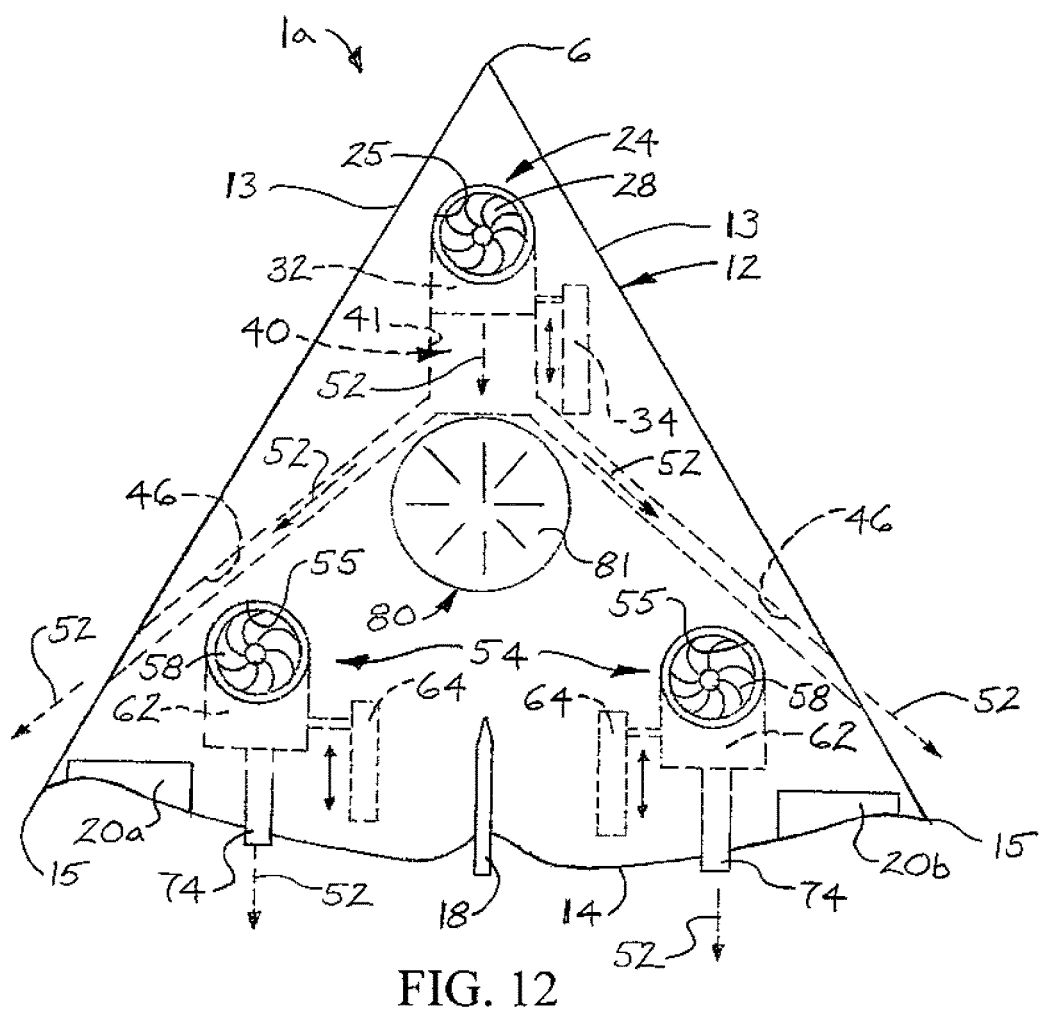
FIG. 12 is a top view of an alternative illustrative embodiment of the unmanned aerial vehicle, more particularly illustrating an alternative configuration of the vehicle in which a pair of side discharge pathways extend from the front horizontal air discharge pathway to the respective side wing edges of the vehicle wing.

A pair of inner air discharge conduits 44 may terminate the respective rear pathway segments 43 of the front horizontal air discharge pathway 40. As illustrated in FIGS. 1-4, the inner air discharge conduits 44 may protrude from the dorsal wing surface 16 and extend beyond the rear wing edge 14 of the vehicle wing 12. As illustrated in FIG. 12, in an alternative embodiment indicated by reference numeral 1a, the front horizontal air discharge pathway 40 may include a pair of side discharge pathways 46 which extend from the front pathway segment 41. The side discharge pathways 46 may discharge at the respective side wing edges 13 near the respective wing tips 15 of the vehicle wing 12.

As further illustrated in FIGS. 7-9, a front diverter slot 33 may be provided in the vehicle body 2 adjacent to the front vertical air discharge pathway 30. A front lens or air diverter 32 may be selectively extendible from a retracted configuration inside the front diverter slot 33, as illustrated in FIG. 8, to an extended configuration in which the front air diverter 32 blocks the front vertical air discharge pathway 30, as illustrated in FIGS. 7 and 9. Accordingly, when the front air diverter 32 is deployed in the extended position illustrated in FIGS. 7 and 9, responsive to operation of the front motor assembly 24, the ducted front fan 28 draws air 52 downwardly from the area above the vehicle body 2 through the front motor opening 25. The air 32 strikes the deployed front air diverter 32, which directs the air 52 rearwardly into and through the front pathway segment 41 of the front horizontal air discharge pathway 40. As illustrated in FIG. 10, the air 52 flows from the front pathway segment 41 through the side pathway segments 42 and the rear pathway segments 43, respectively, of the front horizontal air discharge pathway 40. The air 52 is discharged from the rear of the unmanned aerial vehicle 1 through the respective inner air discharge conduits 44, imparting forward thrust to the unmanned aerial vehicle 1. Conversely, when the front air diverter 32 is deployed in the retracted position in the front diverter slot 33, as illustrated in FIG. 8, the air 52 flows directly through the front motor opening 25 and front vertical air discharge pathway 30, respectively, in a downward vertical flow path to impart vertical lift 38 to the unmanned aerial vehicle 1. As illustrated in FIG. 8, in some embodiments, a front valve 36 (illustrated in phantom) may be deployed when the front air diverter 32 is in the retracted position within the front diverter slot 33. The deployed front valve 36 may prevent air 52 from flowing from the front vertical air discharge pathway 30 into the front pathway segment 41 of the front horizontal air discharge pathway 40.

Figure 5:
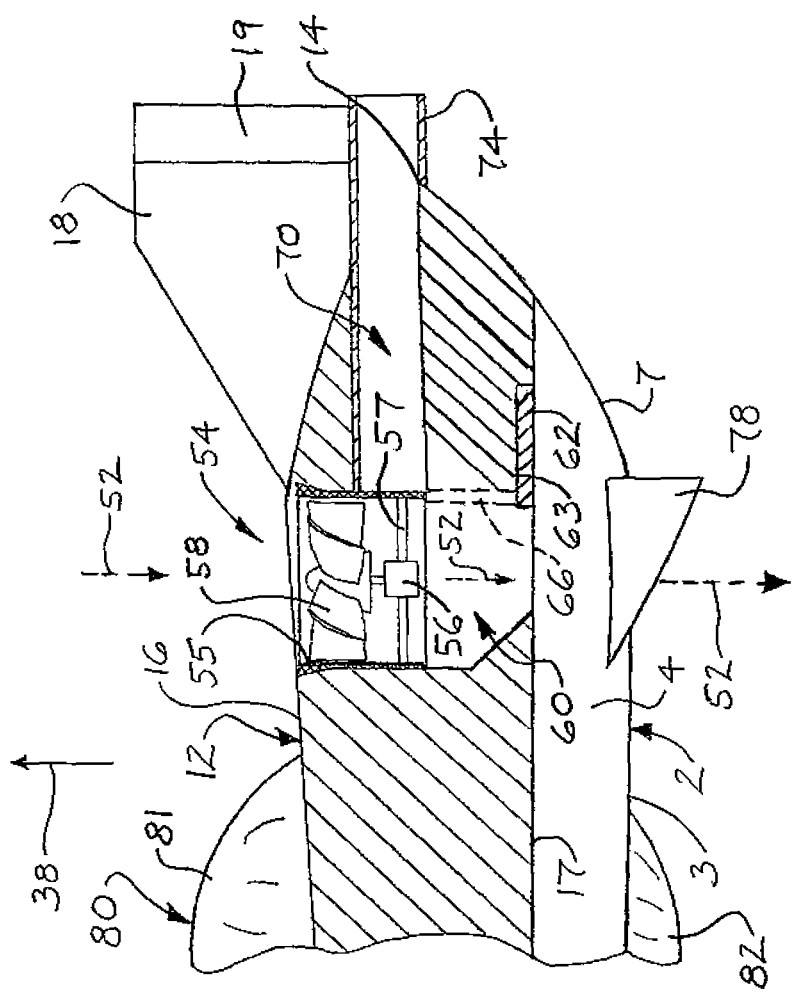
FIG. 5 is an enlarged cross-sectional view of a rear portion of the unmanned aerial vehicle, taken along section lines 5-5 in FIG. 2, more particularly illustrating structural details of a typical rear motor assembly and rear vertical and horizontal air discharge pathways, with air flowing through the rear vertical discharge pathway for upward thrust and vertical takeoff of the unmanned aerial vehicle.
Figure 6:
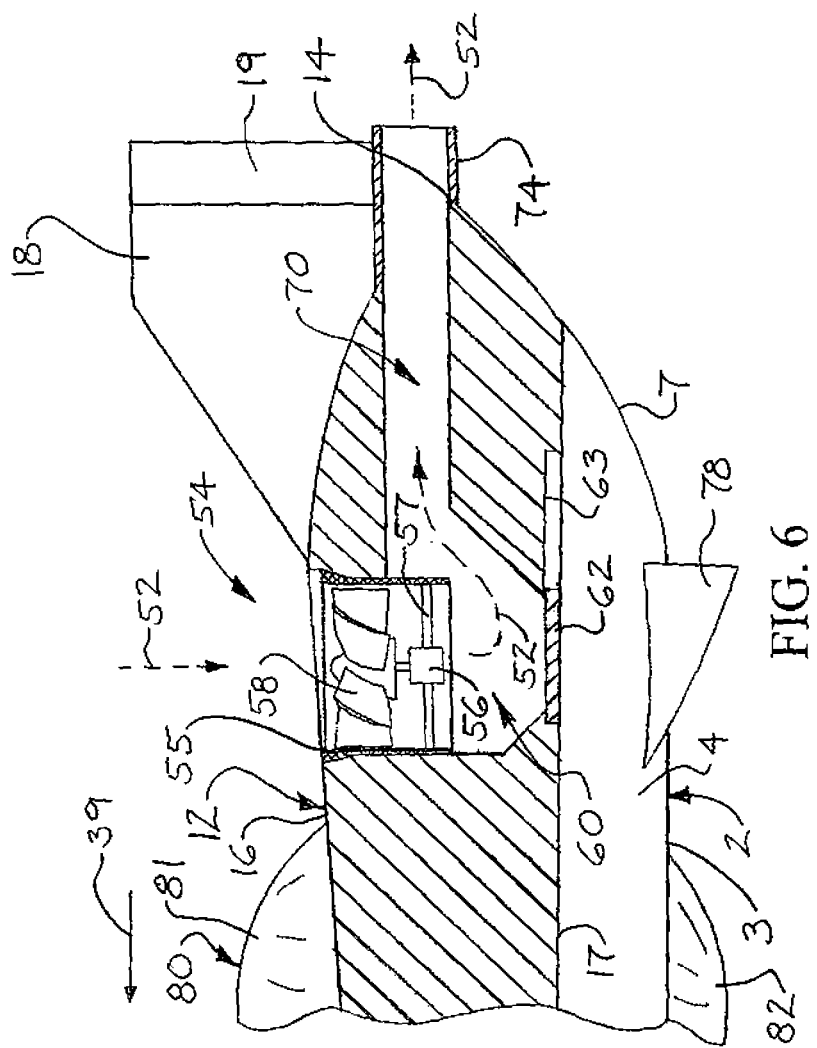
FIG. 6 is an enlarged sectional view of the rear portion of the unmanned aerial vehicle with the air flowing through the rear horizontal air discharge pathway for forward thrust and horizontal flight of the vehicle.

As illustrated in FIGS. 1-3, a pair of rear motor assemblies 54 may be provided in the side and rear portions of the vehicle wing 12. As illustrated in FIGS. 5 and 6, each rear motor assembly 54 may include a rear motor opening 55 which extends into the dorsal wing surface 16 of the vehicle wing 12. A rear fan motor 56 may be mounted inside the rear motor opening 55 typically via multiple motor supports 57. A ducted rear fan 58 may be drivingly engaged by the rear fan motor 56 inside the rear motor opening 55. A rear vertical discharge pathway 60 may be disposed in pneumatic communication with the rear motor opening 55 and may discharge at the ventral wing surface 17 of the vehicle wing 12. A rear horizontal air discharge pathway 70 may be disposed in pneumatic communication with the rear vertical discharge pathway 60. An outer air discharge conduit 74 may communicate with each rear horizontal air discharge pathway 70. The outer air discharge conduit 74 may protrude beyond the dorsal wing surface 16 of the vehicle wing 12 and may extend past the rear wing edge 14 of the vehicle wing 12. As illustrated in FIGS. 1-3, the outer air discharge conduits 74 may be disposed outside the respective inner air discharge conduits 44.

As further illustrated in FIGS. 5 and 6, a rear diverter slot 63 may be provided in the vehicle wing 12 adjacent to the rear vertical air discharge pathway 60. A rear lens or air diverter 62 may be selectively extendible from a retracted configuration inside the rear diverter slot 63, as illustrated in FIG. 5, to an extended configuration in which the rear air diverter 62 blocks the rear vertical air discharge pathway 60, as illustrated in FIG. 6. Accordingly, in operation of the rear motor assembly 54, the ducted rear fan 58 draws air 52 from the area above the vehicle wing 12 downwardly through the rear motor opening 55 and into the rear vertical discharge pathway 60. In the retracted position of the rear air diverter 62 illustrated in FIG. 5, the air 52 flows straight through the rear vertical discharge pathway 60 in a downward flow path and is discharged beneath the vehicle wing 12, imparting vertical lift to the unmanned aerial vehicle 1. When the rear air diverter 62 is deployed in the extended position illustrated in FIG. 6, the rear air diverter 62 blocks the air 52 from flowing straight through the rear vertical discharge pathway 60 and diverts the air 52 rearwardly through the rear horizontal air discharge pathway 70. The air 52 is discharged through the outer air discharge conduit 74 at the rear of the unmanned aerial vehicle 1, imparting forward thrust 39 to the unmanned aerial vehicle 1. As illustrated in FIG. 5, in some embodiments, a rear valve 66 (illustrated in phantom) may be deployed to block the rear horizontal air discharge pathway 70 from the rear vertical discharge pathway 60 and prevent flow of air 52 into the rear horizontal air discharge pathway 70 when the rear air diverter 62 is in the retracted position in the rear diverter slot 63.

Figure 11:
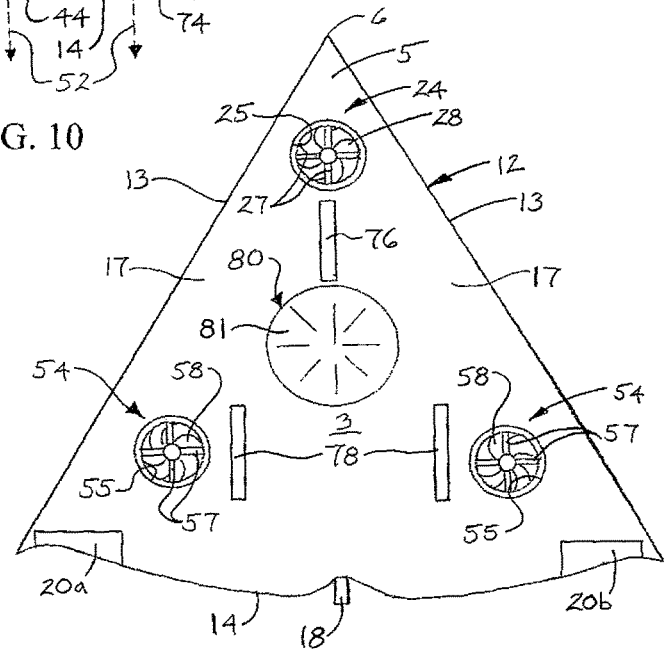
FIG. 11 is a bottom view of an illustrative embodiment of the unmanned aerial vehicle.

As illustrated in FIG. 11, in some embodiments, a front landing skid 76 may protrude from the ventral body surface 3 of the vehicle body 2. The front landing skid 76 may be positioned behind the front motor assembly 24. A pair of rear landing skids 78 may protrude from the ventral wing surface 17 of the vehicle wing 12. The rear landing skids 78 may be disposed inside and adjacent to the respective rear motor assemblies 54. Accordingly, the front landing skid 76 and the rear landing skids 78 may support the unmanned aerial vehicle 1 on the ground 50 (FIG. 14) preparatory to takeoff and after landing of the unmanned aerial vehicle 1, as will be hereinafter further described.

In some embodiments, a camera compartment 80 may be provided in the vehicle body 2 and/or the vehicle wing 12 of the unmanned aerial vehicle 1. The camera compartment 80 may be provided at substantially the geometric center and/or center of gravity of the unmanned aerial vehicle 1. As illustrated in FIG. 7, in some embodiments, the camera compartment 80 may be generally spherical in shape and may include an upper camera housing 81 which protrudes beyond the dorsal wing surface 16 of the vehicle wing 12 and a lower camera housing 82 which protrudes beyond the ventral body surface 3 of the vehicle body 2. The upper camera housing 81 and the lower camera housing 82 of the camera compartment 80 may be a transparent material such as plastic or glass. At least one camera 83 may be provided in the camera compartment 80. The camera 83 may include a still camera and/or a video camera which is capable of capturing images through the upper camera housing 81 or the lower camera housing 82. The camera 83 may be mounted for multi-positional orientation according to the knowledge of those skilled in the art. As illustrated in FIG. 10, the side pathway segments 42 of the front horizontal air discharge pathway 40 may curve around the respective sides of the camera compartment 80.

Figure 13:
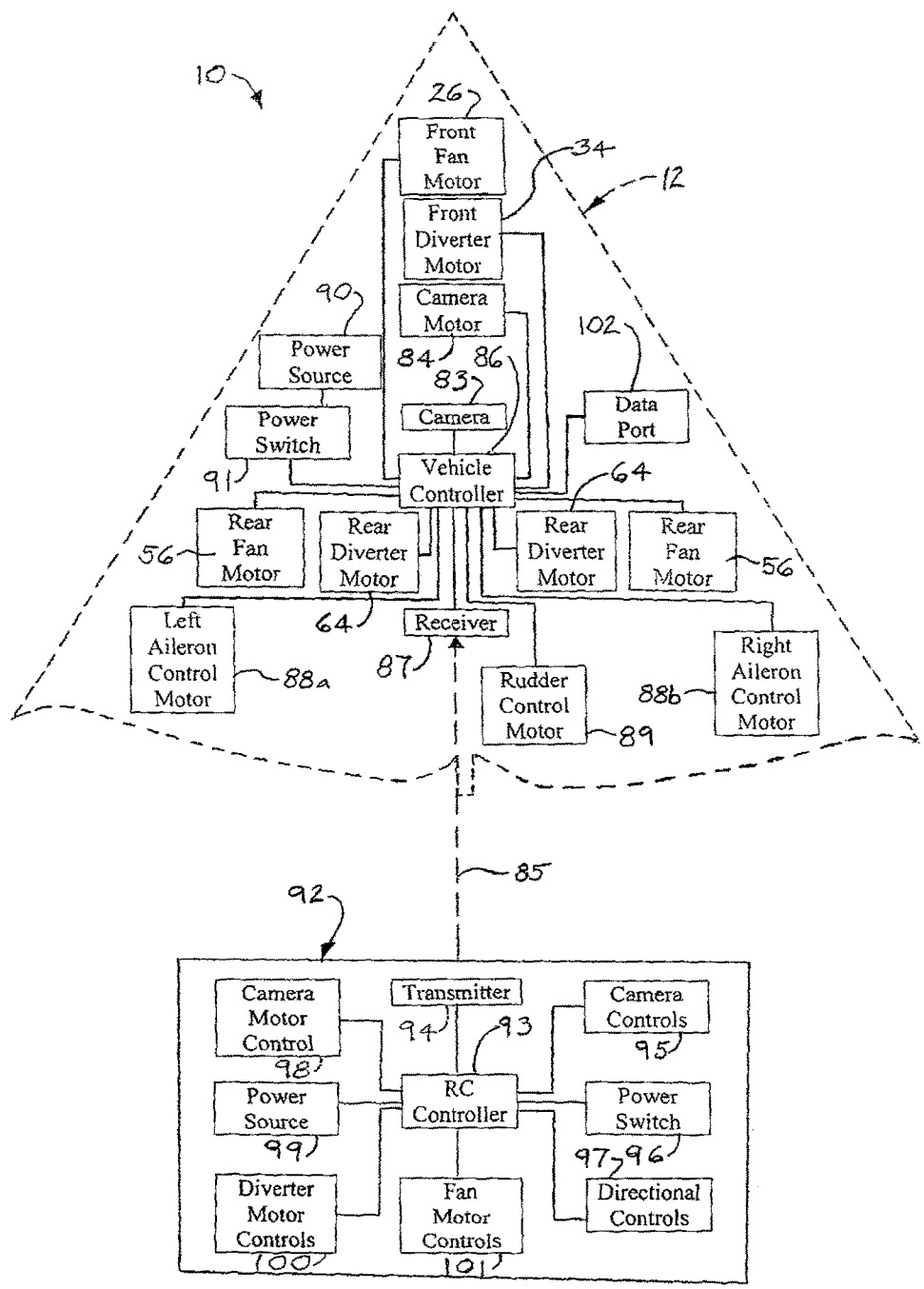
FIG. 13 is a schematic functional block diagram which illustrates various functional components of the unmanned aerial vehicle and of a remote control unit operable in remote control of the unmanned aerial vehicle.

A typical vehicle control system 10 which is suitable for facilitating control of the unmanned aerial vehicle 1 in flight is illustrated in FIG. 13. Accordingly, the vehicle control system 10 may include an onboard vehicle controller 86 with memory on the unmanned aerial vehicle 1. A receiver 87 may interface with the vehicle controller 86. A left aileron control motor 88a and a right aileron control motor 88b may interface with the vehicle controller 86. The left aileron control motor 88a and the right aileron control motor 88b may operatively engage the respective left aileron 20a and right aileron 20b (FIGS. 1 and 2) in the vehicle wing 12 to facilitate deployment of the ailerons 20a, 20b for banking or a level flight of the unmanned aerial vehicle 1, as will be hereinafter described. A rudder control motor 89 may interface with the vehicle controller 86. The rudder control motor 89 may operatively engage the rudder 19 (FIG. 4) on the vertical stabilizer 18 to facilitate left and right yawing of the unmanned aerial vehicle 1 in flight, as will be hereinafter further described.

A power source 90 may interface with the vehicle controller 86. The power source 90 may include any kind of device or material which is capable of providing electrical current to the various operational components of the unmanned aerial vehicle 1. A power switch 91 may interface with the vehicle controller 86 and the power source 90. The power switch 91 may facilitate selective manual turning of the various components of the unmanned aerial vehicle 1 on and off for operation.

A front diverter motor 34 may interface with the vehicle controller 86. As illustrated in FIG. 10, the front diverter motor 34 may operatively engage the front air diverter 32 of the front motor assembly 24 to facilitate selective positioning of the front air diverter 32 between the retracted position illustrated in FIG. 8 and the extended position illustrated in FIGS. 7 and 9. A pair of rear diverter motors 64 may interface with the vehicle controller 86. As further illustrated in FIG. 10, each rear diverter motor 64 may operatively engage the rear air diverter 62 of the corresponding rear motor assembly 54 to facilitate positioning of the rear air diverter 62 between the retracted position illustrated in FIG. 5 and the extended position illustrated in FIG. 6.

As further illustrated in FIG. 13, the front fan motor 26 of the front motor assembly 24 and each rear fan motor 56 of the corresponding rear motor assembly 54 may interface with the vehicle controller 86. Accordingly, the vehicle controller 86 may facilitate operation of the front fan motor 26 and each rear fan motor 56 for vertical takeoff and horizontal flight of the unmanned aerial vehicle 1, as will be hereinafter described. As further illustrated in FIG. 13, the camera 83 in the camera compartment 80 may interface with the vehicle controller 86. The vehicle controller 86 may facilitate control of the various operations of the camera 83 typically in the conventional manner. In some embodiments, a camera motor 84 may interface with the vehicle controller 86. The camera motor 84 may operatively engage the camera 83 to facilitate selective positioning of the camera 83 within the camera compartment 80 according to the knowledge of those skilled in the art.

In some embodiments, a data port 102 may interface with the vehicle controller 86. The data port may include a USB (Universal Serial Bus) port or any other port which facilitates transfer of data from an external device (not illustrated) to the vehicle controller 86. Accordingly, in some applications of the unmanned aerial vehicle 1, which will be hereinafter described, GPS data and data which relates to flight characteristics, altitude, distance and destination may be loaded from the external device into the vehicle controller 86 by connecting the external device to the data port 102. Thus, the flight trajectory for the unmanned aerial vehicle 1 can be loaded into the vehicle controller 86 such that the vehicle controller 86 controls the flight of the unmanned aerial vehicle 1 from a selected origin to a selected destination.

As further illustrated in FIG. 13, the vehicle control system 10 may include a remote control unit 92 which enables a human operator (not illustrated) to control the various operational functions of the unmanned aerial vehicle 1. The remote control unit 92 may include an RC controller 93. A transmitter 94 may interface with the RC controller 93. Responsive to input from the RC controller 93, the transmitter 94 may transmit an RF control signal 85 which is received by the receiver 87 of the unmanned aerial vehicle 1. The vehicle controller 86 may responsively control the front fan motor 26, the rear fan motors 56, the front diverter motor 34, the rear diverter motors 64, the left aileron control motor 88a, the right aileron control motor 88b and the rudder control motor 89 to facilitate the selected flight trajectory and characteristics of the unmanned aerial vehicle 1. The vehicle controller 86 may additionally facilitate operational control of the camera 83 for photo and/or video ground or aerial surveillance during flight.

Camera controls 95 may interface with the RC controller 93. The camera controls 95 may facilitate control of the camera 83 and the camera motor 84 on the unmanned aerial vehicle 1. A power switch 96 may interface with the RC controller 93 to facilitate turning the remote control unit 92 on and off. Directional controls 97 may interface with the RC controller 93 to facilitate operation of the rudder control motor 89, the left aileron control motor 88a and the right aileron control motor 88b for respective control of the rudder 19, the left aileron 20a and the right aileron 20b on the unmanned aerial vehicle 1. A camera motor control 98 may interface with a RC controller 93 to facilitate control of the camera motor 84 on the unmanned aerial vehicle 1. A power source 99 such as batteries or solar panels, for example, and without limitation, may interface with the RC controller 93. Diverter motor controls 100 may interface with the RC controller 93 to facilitate control of the front diverter motor 34 and the rear diverter motors 64 on the unmanned aerial vehicle 1. Fan motor controls 101 may interface with the RC controller 93 to facilitate control of the front fan motor 26 of the front motor assembly 24 and the rear fan motor 56 of each rear motor assembly 54 on the unmanned aerial vehicle 1. The fan motor controls 101 may include control of the operational speed of the front fan motor 26 in each rear fan motor 56. In some embodiments, the directional controls 97, the diverter motor controls 100 and the fan motor controls 101 may include joystick controls known by those skilled in the art.

Figure 14:
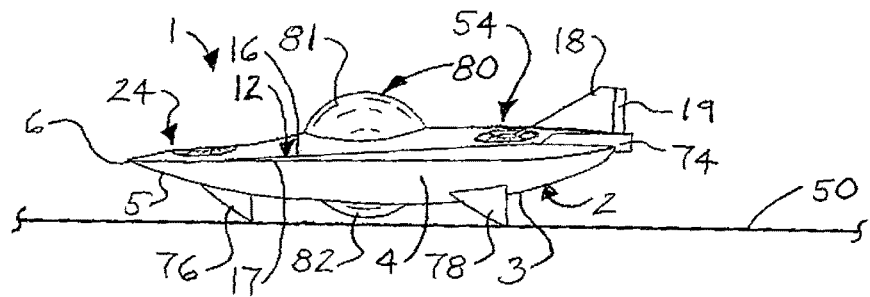
FIG. 14 is a left side view of the illustrative unmanned aerial vehicle, resting on the ground before takeoff.

Referring next to FIGS. 14-17 of the drawings, in typical application, the unmanned aerial vehicle 1 is flown at a selected height or altitude for aerial surveillance, ground surveillance and/or other uses. Accordingly, as illustrated in FIG. 14, the unmanned aerial vehicle 1 is initially placed level on the ground 50 with the front landing skid 76 and the rear landing skids 78 supporting the unmanned aerial vehicle 1. Electrical power from the power source 90 (FIG. 13) to the front fan motor 26 and the rear fan motors 56 through the vehicle controller 86 may be established typically by manipulation of the power switch 91 from the "off" position to the "on" position. The remote control unit 92 may be turned on by manipulation of the power switch 96 from the "off" position to the "on" position. The diverter motor controls 100 on the remote control unit 92 may be manipulated to retract the front air diverter 32 into the front diverter slot 33 (FIG. 8) and the rear air diverters 62 into the respective rear diverter slots 63 (FIG. 5) by actuation of the front diverter motor 34 and the rear diverter motors 64, respectively.

Figure 15:
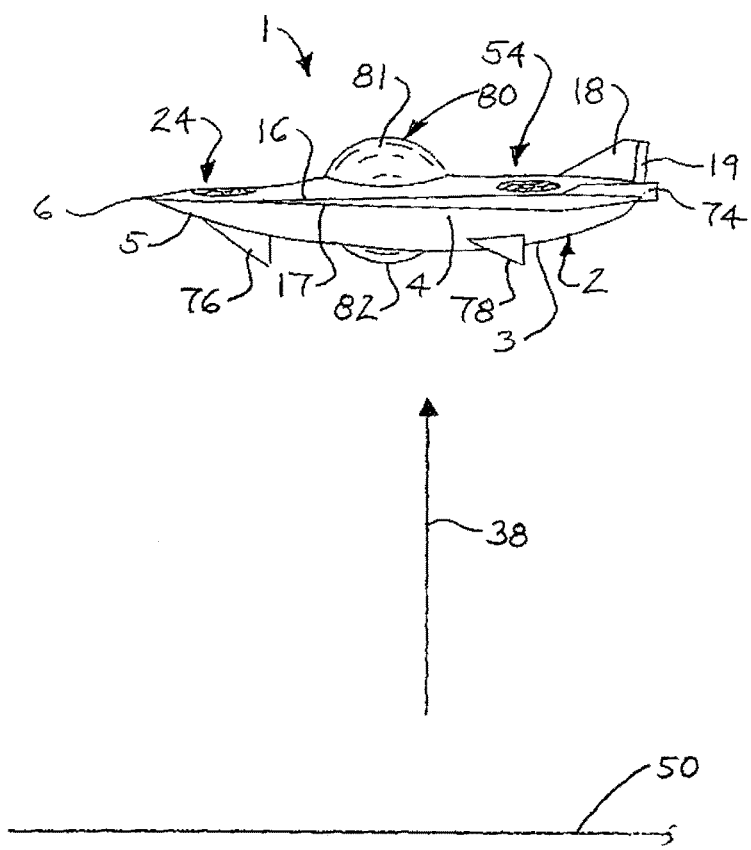
FIG. 15 is a left side view of the unmanned aerial vehicle upon vertical takeoff.
Figure 16:
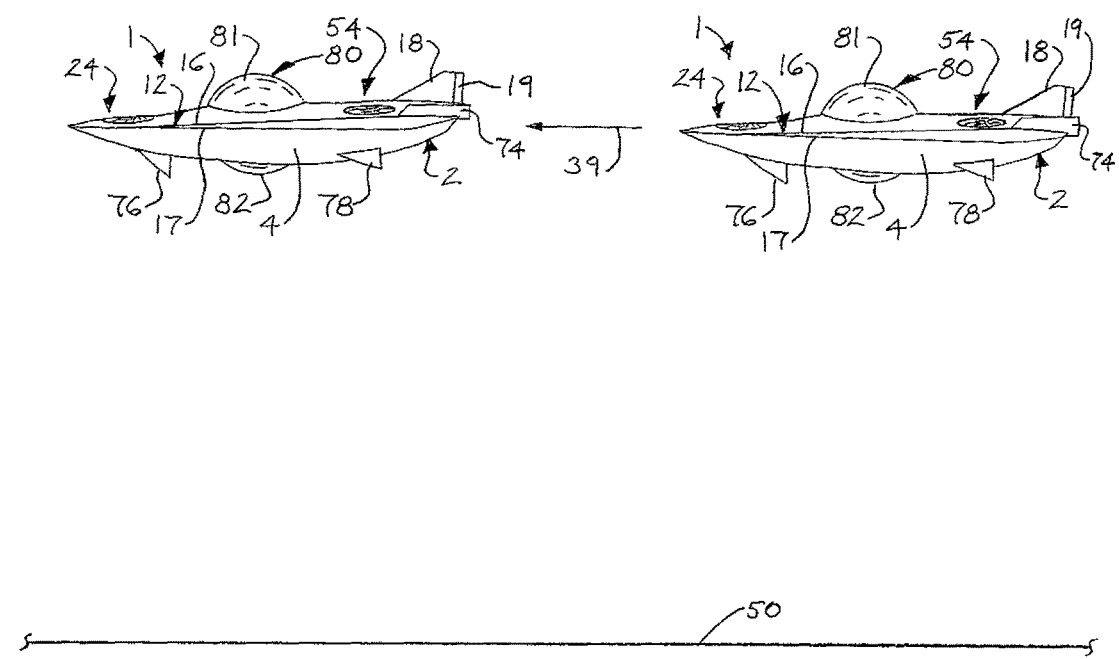
FIG. 16 is a left side view of the unmanned aerial vehicle in forward horizontal flight of the vehicle.

The fan motor controls 101 on the remote control unit 92 may then be manipulated to facilitate operation of the front fan motor 26 of the front motor assembly 24 and the rear fan motor 56 of each rear motor assembly 54. Accordingly, as illustrated in FIG. 8, the ducted front fan 28 of the front motor assembly 24 draws air 52 from above the vehicle wing 12 straight through the front motor opening 25 and front vertical air discharge pathway 30, respectively, discharging the air 52 beneath the unmanned aerial vehicle 1. Likewise, as illustrated in FIG. 5, the ducted rear fan 58 of each rear motor assembly 54 draws air 52 from above the unmanned aerial vehicle 1 straight through the rear motor opening 55 and rear vertical discharge pathway 60, respectively, discharging the air 52 beneath the unmanned aerial vehicle 1. Thus, the flowing air 52 imparts vertical lift 38 to the unmanned aerial vehicle 1, causing it to climb to the desired altitude, as illustrated in FIG. 15.

After the unmanned aerial vehicle 1 has reached the desired altitude, the diverter motor controls 100 (FIG. 13) on the remote control unit 92 may be manipulated to actuate the front diverter motor 34 such that the front air diverter 32 is deployed from the retracted position in the front diverter slot 33, as illustrated in FIG. 8, to the extended position illustrated in FIGS. 7 and 9, in which the front air diverter 32 blocks the front vertical air discharge pathway 30. Thus, the front air diverter 32 diverts the flowing air 52 from the front vertical air discharge pathway 30 into the front horizontal air discharge pathway 40 (FIG. 9). As illustrated in FIG. 10, the air 52 flows from the front pathway segment 41 through the side pathway segments 42 and rear pathway segments 43, respectively, of the front horizontal air discharge pathway 40 and is discharged to the rear of the unmanned aerial vehicle 1 through the respective inner air discharge conduits 44. In like manner, each rear diverter motor 64 deploys the corresponding rear air diverter 62 from the retracted position in the rear diverter slot 63, as illustrated in FIG. 5, to the extended position, as illustrated in FIG. 6, in which the rear air diverter 62 blocks the rear vertical air discharge pathway 60. Thus, each rear air diverter 62 diverts the air 52 from the rear vertical discharge pathway 60 through the rear horizontal air discharge pathway 70. The air 52 is discharged from the corresponding outer air discharge conduit 74 to the rear of the unmanned aerial vehicle 1, imparting forward thrust 39 (FIG. 16) to the unmanned aerial vehicle 1. Thus, the air flowing over the vehicle wing 12 produces lift and maintains the unmanned aerial vehicle 1 in forward flight. The forward flight speed of the unmanned aerial vehicle 1 can be selectively controlled by operation of the fan motor controls 101 on the remote control unit 92. This action varies the operational speed of the front fan motor 26 and each rear fan motor 56 to accordingly vary the speed of the flowing air 52 as it is discharged from the inner air discharge conduits 44 and the outer air discharge conduit 74, and accordingly, vary the forward thrust 39 and speed of the unmanned aerial vehicle 1.

The directional controls 97 on the remote control unit 92 may be manipulated to operate the left aileron control motor 88a, the right aileron control motor 88b and the rudder control motor 89. Thus, the directional controls 97 may facilitate banking and turning of the unmanned aerial vehicle 100 to the left or right while in flight.

The camera 83 can be operated by manipulation of the camera controls 95 on the remote control unit 92. The camera controls 95 may include options for zooming, contrast, color, brightness and selection of still shots or video. The camera motor control 98 can be manipulated to operate the camera motor 84, which orients the camera 83 in the desired position in the camera compartment 80. Thus, in some applications, the camera motor 84 may be operated to orient the camera 83 such that the filming angle of the camera 83 is oriented through the upper camera housing 81 of the camera compartment 80 for air surveillance. In other applications, the camera motor 84 may be operated to orient the camera 83 such that the viewing angle of the camera 83 is oriented through the lower camera housing 82 of the camera compartment 84 for ground surveillance.

Figure 17:
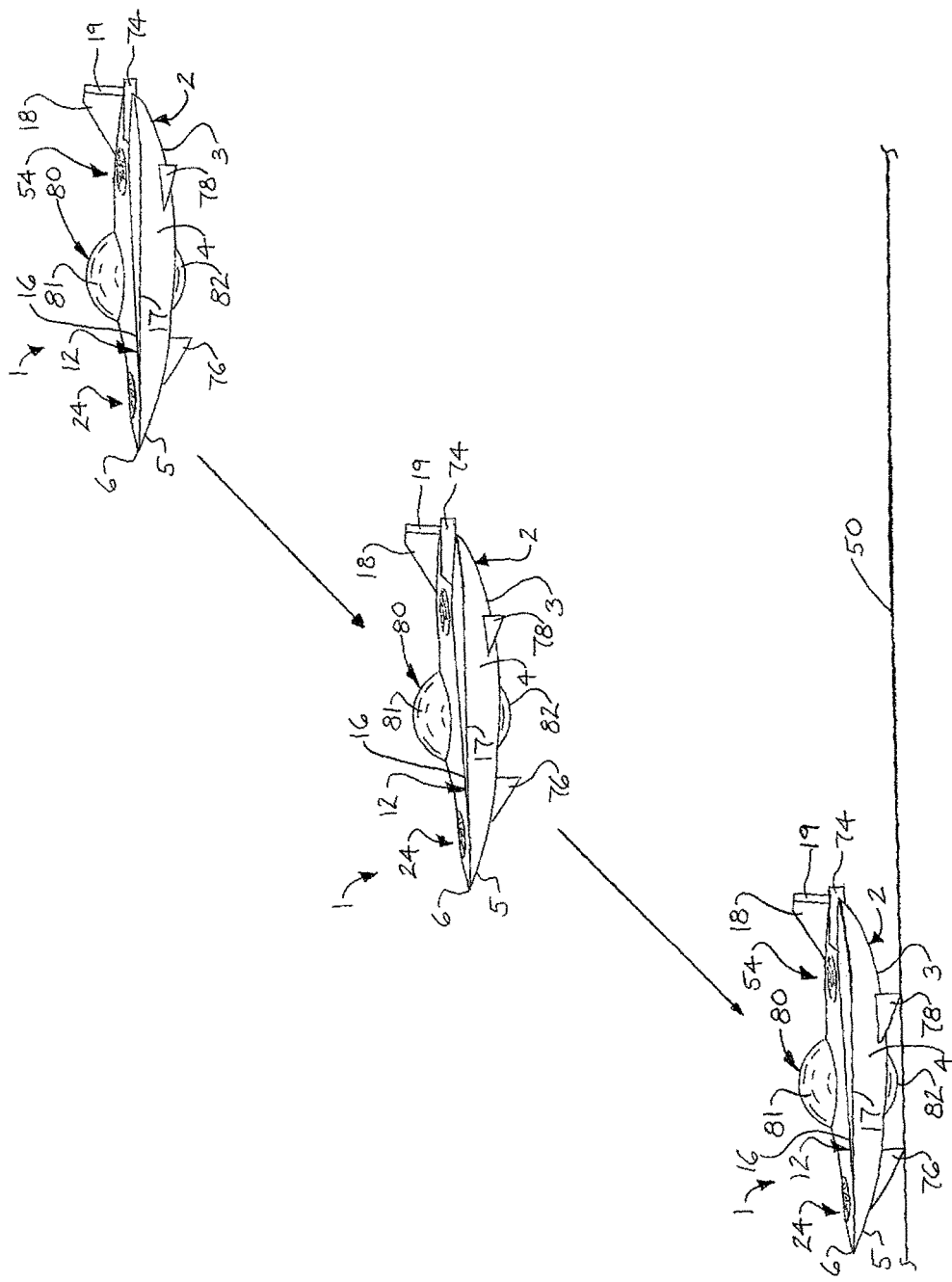
FIG. 17 are left side views of the unmanned aerial vehicle, more particularly illustrating glided landing of the vehicle from a horizontal flight position back to the ground.

As illustrated in FIG. 17, the unmanned aerial vehicle 1 can be selectively landed from horizontal flight by terminating operation of the front fan motor 26 and each rear fan motor 56. Accordingly, the unmanned aerial vehicle 1 glides from the cruising altitude to the ground 50. After landing, the diverter motor controls 100 (FIG. 13) can be manipulated to return the front air diverter 32 from the extended position (FIG. 9) to the retracted position (FIG. 8) and each rear air diverter 62 from the extended position (FIG. 6) to the retracted position (FIG. 5). In some embodiments, the power source 90 on the unmanned aerial vehicle 1 and the power source 99 on the remote control unit 92 can be selectively recharged, as necessary, by connecting a conventional power cord (not illustrated) to an external power supply and to the power source 90 of the unmanned aerial vehicle 1 and the power source 99 on the remote control unit 92, respectively.

Figure 9B:
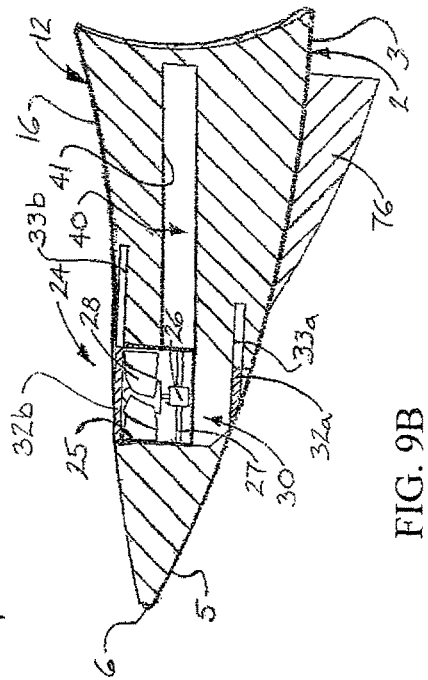
FIG. 9B is an enlarged sectional view of the front portion of the alternative illustrative embodiment of the unmanned aerial vehicle illustrated in FIG. 6A, with the lower front air diverter and the upper front air diverter in a closed position.
Figure 9A:
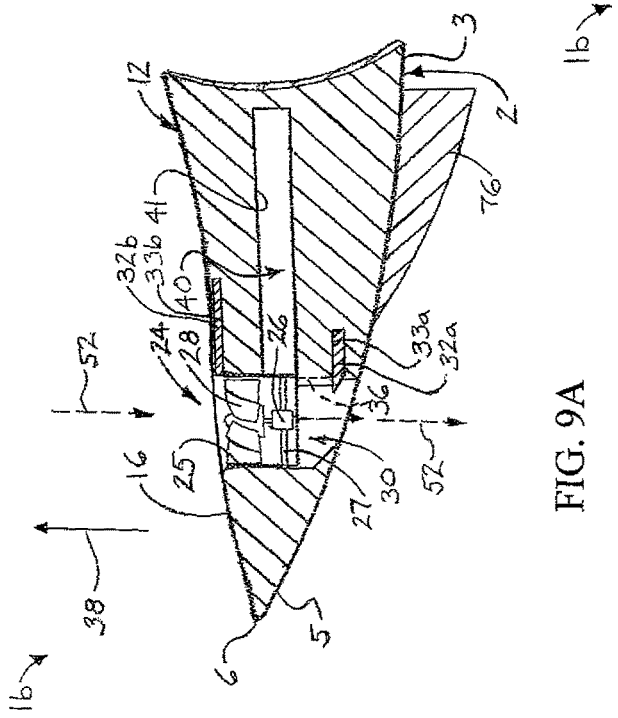
FIG. 9A is an enlarged sectional view of the front portion of the alternative illustrative embodiment of the unmanned aerial vehicle illustrated in FIG. 6A, more particularly illustrating a lower front air diverter and an upper front air diverter in an open position for upward thrust and vertical takeoff of the unmanned aerial vehicle.
Figure 9C:
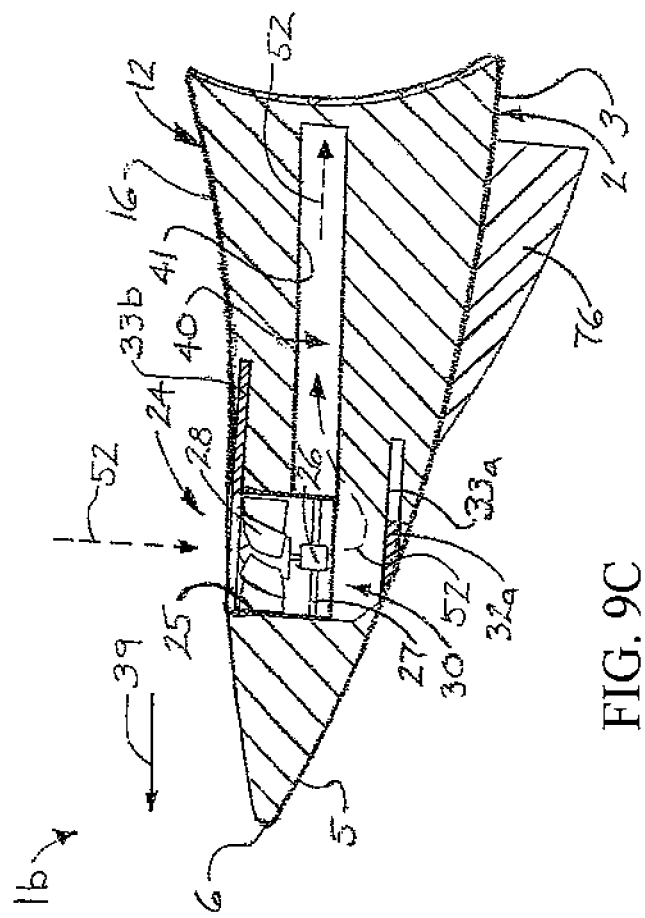
FIG. 9C is an enlarged sectional view of the front portion of the alternative illustrative embodiment of the unmanned aerial vehicle illustrated in FIG. 6A, with the lower front air diverter in the closed position and the upper front air diverter in the open position for horizontal thrust and forward flight of the vehicle in some applications of the unmanned aerial vehicle.

Referring next to FIGS. 6A-6C and 9A-9C of the drawings, in an alternative illustrative embodiment of the unmanned aerial vehicle 1b, a lower rear air diverter 62a (FIGS. 6A-6C) may be extendable from a lower rear diverter slot 63a, typically in the same manner and for the same purpose as was heretofore described with respect to the rear air diverter 62 and the rear air diverter slot 63 in FIGS. 5 and 6. In like manner, as illustrated in FIGS. 9A-9C, a lower front air diverter 32a may be extendable from a lower front diverter slot 33a typically in the same manner and for the same purpose as was heretofore described with respect to the front air diverter 32 and the front air diverter slot 33 in FIGS. 7-9. As further illustrated in FIGS. 6A-6C, an upper rear air diverter 62b may be selectively extendable from an upper rear air diverter slot 63b in the vehicle wing 12 to cover the upper portion of the rear motor opening 55. As illustrated in FIGS. 9A-9C, an upper front air diverter 32b may be selectively extendable from an upper front diverter slot 33b in the vehicle wing 12 to cover the front motor opening 25. Each of the upper rear air diverter 62b and upper front air diverter 32b may be operatively engaged for opening and closing by a corresponding rear diverter motor 64 and front diverter motor 34 (FIG. 10).

Figure 6B:
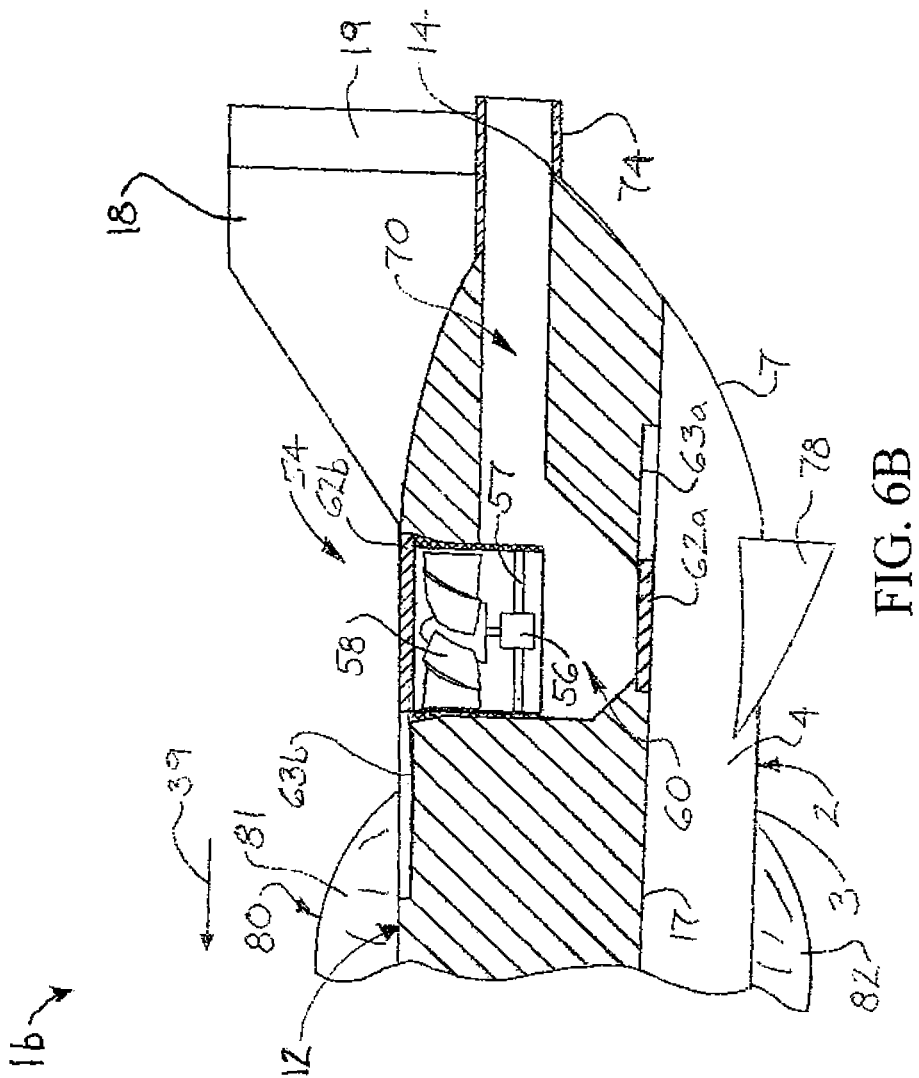
FIG. 6B is an enlarged sectional view of the rear portion of the alternative illustrative embodiment of the unmanned aerial vehicle illustrated in FIG. 6A, more particularly illustrating the lower rear air diverter and the upper rear air diverter in a closed position.
Figure 6C:
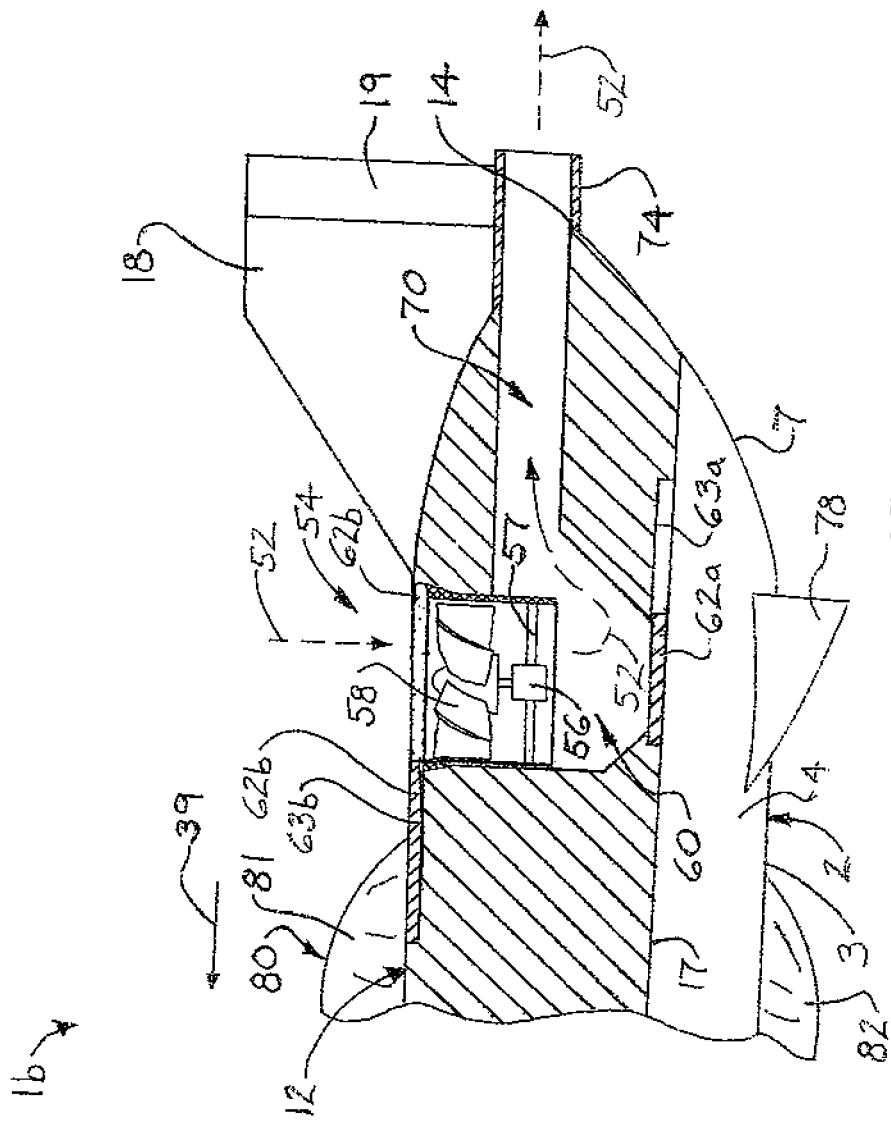
FIG. 6C is an enlarged sectional view of the rear portion of the alternative illustrative embodiment of the unmanned aerial vehicle illustrated in FIG. 6A, more particularly illustrating the lower rear air diverter in the closed position and the upper rear air diverter in the open position for horizontal thrust and forward flight of the vehicle in some applications of the unmanned aerial vehicle.

In vertical takeoff of the unmanned aerial vehicle 1b, both the lower rear air diverter 62a and the upper rear air diverter 62b may be deployed in the open position during operation of the ducted rear fan 58, as illustrated in FIG. 6A, and both the lower front air diverter 32a and the upper front air diverter 32b may be deployed in the open position during operation of the ducted front fan 28, as illustrated in FIG. 9A, to impart vertical lift 38 to the unmanned aerial vehicle 1b. In forward flight of the unmanned aerial vehicle 1b according to some applications, both the lower rear air diverter 62a and the upper rear air diverter 62b may be deployed in the extended or closed position, as illustrated in FIG. 6B, whereas the lower front air diverter 32a may be closed and the upper front air diverter 32b open, as illustrated in FIG. 9C, to facilitate horizontal thrust 39 of the unmanned aerial vehicle 1b by operation of the front motor assembly 24 only. Conversely, in forward flight of the unmanned aerial vehicle 1b according to other applications, both the lower front air diverter 32a and the upper front air diverter 32b may be closed, as illustrated in FIG. 9B, whereas the lower rear air diverter 62a may be closed and the upper rear air diverter 62b open, as illustrated in FIG. 6C, to facilitate horizontal thrust 39 of the unmanned aerial vehicle 16 by operation of the rear motor assemblies 54 only. These configurations of the lower rear air diverter 62a and upper rear air diverter 62b and the lower front air diverter 32a and the upper front air diverter 32b may conserve the quantity of electrical energy which is expended during operation of the unmanned aerial vehicle 1b, and maximize flight efficiency.

While illustrative embodiments of the disclosure have been described above, it will be recognized and understood that various modifications can be made and the appended claims are intended to cover all such modifications which may fall within the spirit and scope of the disclosure.

What is claimed is:
1. An unmanned aerial vehicle, comprising:
a vehicle body having a ventral body surface;

a vehicle wing on the vehicle body, the vehicle wing having a dorsal wing surface and a ventral wing surface, the vehicle wing forming an airfoil;
a front motor assembly including:
   a front fan motor carried by the vehicle body;
   a front fan drivingly engaged by the front fan motor;
   a front vertical air discharge pathway in the vehicle body, the front vertical air discharge pathway disposed in pneumatic communication with the front fan and discharging to the ventral body surface of the vehicle body;
   a front horizontal air discharge pathway in the vehicle body, the front horizontal air discharge pathway disposed in pneumatic communication with the front vertical air discharge pathway and discharging at a wing edge of the vehicle wing;
   a front diverter slot in the vehicle body adjacent to the front vertical air discharge pathway;
   a front air diverter disposed between an extended position blocking the front vertical air discharge pathway and a retracted position within the front diverter slot and removed from and unblocking the front vertical air discharge pathway; and
   a front diverter motor operatively engaging the front air diverter; and
a pair of rear motor assemblies each including:
   a rear fan motor carried by the vehicle wing;
   a rear fan drivingly engaged by the rear fan motor;
   a rear vertical air discharge pathway in the vehicle wing, the rear vertical air discharge pathway disposed in pneumatic communication with the rear fan and discharging to the ventral wing surface of the vehicle wing;
   a rear diverter slot in the vehicle body adjacent to the rear vertical air discharge pathway;
   a rear horizontal air discharge pathway in the vehicle wing, the rear horizontal air discharge pathway disposed in pneumatic communication with the rear vertical air discharge pathway and discharging at an edge of the vehicle wing;
   a rear air diverter disposed between an extended position blocking the rear vertical air discharge pathway and a retracted position within the rear diverter slot and removed from and unblocking the rear vertical air discharge pathway; and
   a rear diverter motor operatively engaging the rear air diverter.

2. The unmanned aerial vehicle of claim 1 further comprising a vertical stabilizer upward-standing from the vehicle wing, a rudder in the vertical stabilizer and a rudder control motor operatively engaging the rudder.

3. The unmanned aerial vehicle of claim 1 further comprising a camera compartment carried by the vehicle body and at least one camera in the camera compartment.

4. The unmanned aerial vehicle of claim 3 wherein the camera compartment comprises an upper camera housing protruding beyond the dorsal wing surface of the vehicle wing and a lower camera housing protruding beyond the ventral body surface of the vehicle body.

5. The unmanned aerial vehicle of claim 3 further comprising a camera motor operatively engaging the at least one camera for multi-positioning capability of the at least one camera.

6. The unmanned aerial vehicle of claim 1 further comprising a pair of ailerons carried by the vehicle wing and a pair of aileron control motors operatively engaging the pair of ailerons, respectively.

7. The unmanned aerial vehicle of claim 1 further comprising a front landing skid protruding from the ventral body surface of the vehicle body and a pair of spaced-apart rear landing skids protruding from the ventral wing surface of the vehicle wing.

8. The unmanned aerial vehicle of claim 1 further comprising a front valve deployed between the front vertical air discharge pathway and the front horizontal air discharge pathway when the front air diverter is in the extended position and a rear valve deployed between the rear vertical air discharge pathway and the rear horizontal air discharge pathway when the rear air diverter is in the extended position.

9. An unmanned aerial vehicle, comprising:
a vehicle body having a nose, a tail and a ventral body surface extending from the nose to the tail;
a vehicle wing on the vehicle body, the vehicle wing having a pair of side wing edges, a rear wing edge extending between the side wing edges and a dorsal wing surface and a ventral wing surface extending between the side wing edges and the rear wing edge, the vehicle wing forming an airfoil;
a front motor assembly including:
   a front fan motor carried by the vehicle body;
   a ducted front fan drivingly engaged by the front fan motor;
   a front vertical air discharge pathway in the vehicle body, the front vertical air discharge pathway disposed in pneumatic communication with the front fan and discharging to the ventral body surface of the vehicle body;
   a front horizontal air discharge pathway in the vehicle body, the front horizontal air discharge pathway disposed in pneumatic communication with the front vertical air discharge pathway and discharging at the rear wing edge of the vehicle wing;
   a front diverter slot in the vehicle body adjacent to the front vertical air discharge pathway;
   a front air diverter disposed between an extended position blocking the front vertical air discharge pathway and a retracted position within the front diverter slot and removed from and unblocking the front vertical air discharge pathway;
   a front diverter motor operatively engaging the front air diverter; and
a pair of rear motor assemblies each including:
   a rear fan motor carried by the vehicle wing;
   a ducted rear fan drivingly engaged by the rear fan motor;
   a rear vertical air discharge pathway in the vehicle wing, the rear vertical air discharge pathway disposed in pneumatic communication with the rear fan and discharging to the ventral wing surface of the vehicle wing;
   a rear diverter slot in the vehicle body adjacent to the rear vertical air discharge pathway;
   a rear horizontal air discharge pathway in the vehicle wing, the rear horizontal air discharge pathway disposed in pneumatic communication with the rear vertical air discharge pathway and discharging at the rear wing edge of the vehicle wing;
   a rear air diverter disposed between an extended position blocking the rear vertical air discharge pathway and a retracted position within the rear diverter slot and removed from and unblocking the rear vertical air discharge pathway; and a rear diverter motor operatively engaging the rear air diverter;
a vertical stabilizer upward-standing from the vehicle wing;
a rudder in the vertical stabilizer;
a rudder control motor operatively engaging the rudder;
a pair of ailerons carried by the vehicle wing; and
a pair of aileron control motors operatively engaging the pair of ailerons, respectively.

10. The unmanned aerial vehicle of claim 9 further comprising a camera compartment carried by the vehicle body and at least one camera in the camera compartment.

11. The unmanned aerial vehicle of claim 10 wherein the camera compartment comprises an upper camera housing protruding beyond the dorsal wing surface of the vehicle wing and a lower camera housing protruding beyond the ventral body surface of the vehicle body.

12. The unmanned aerial vehicle of claim 10 further comprising a camera motor operatively engaging the at least one camera for multi-positioning capability of the at least one camera.

13. The unmanned aerial vehicle of claim 10 wherein the front horizontal air discharge pathway comprises a front pathway segment disposed in pneumatic communication with the front vertical air discharge pathway, a pair of curved side pathway segments disposed in pneumatic communication with the front pathway segment on respective sides of the camera compartment and a pair of rear pathway segments disposed in pneumatic communication with the side pathway segments, respectively, and discharging to the rear wing edge of the vehicle wing.

14. The unmanned aerial vehicle of claim 13 further comprising a pair of discharge conduits disposed in pneumatic communication with the pair of rear pathway segments, respectively, of the front horizontal air discharge pathway.

15. The unmanned aerial vehicle of claim 9 further comprising a front landing skid protruding from the ventral body surface of the vehicle body and a pair of spaced-apart rear landing skids protruding from the ventral wing surface of the vehicle wing.

16. The unmanned aerial vehicle of claim 9 further comprising a front valve deployed between the front vertical air discharge pathway and the front horizontal air discharge pathway when the front air diverter is in the extended position and a rear valve deployed between the rear vertical air discharge pathway and the rear horizontal air discharge pathway when the rear air diverter is in the extended position.

17. An unmanned aerial vehicle, comprising:
a vehicle body having a nose, a tail and a ventral body surface extending from the nose to the tail;
a vehicle wing on the vehicle body, the vehicle wing having a pair of side wing edges diverging from the nose of the vehicle body, a rear wing edge extending between the side wing edges and a dorsal wing surface and a ventral wing surface extending between the side wing edges and the rear wing edge, the vehicle wing forming an airfoil;
a camera compartment carried by the vehicle body;
at least one camera in the camera compartment;
a front motor assembly including:
a front motor opening in the vehicle body;
a front fan motor in the front motor opening;
a ducted front fan drivingly engaged by the front fan motor;
a front vertical air discharge pathway in the vehicle body, the front vertical air discharge pathway disposed in pneumatic communication with the front motor opening and discharging to the ventral body surface of the vehicle body;
a front horizontal air discharge pathway in the vehicle body, the front horizontal air discharge pathway disposed in pneumatic communication with the front vertical air discharge pathway and discharging at the rear wing edge of the vehicle wing;
a front diverter slot in the vehicle body adjacent to the front vertical air discharge pathway;
a front air diverter disposed between an extended position blocking the front vertical air discharge pathway and a retracted position in the front diverter slot and removed from and unblocking the front vertical air discharge pathway;
a front diverter motor operatively engaging the front air diverter; and
a pair of rear motor assemblies each including:
a rear fan motor carried by the vehicle wing;
a ducted rear fan drivingly engaged by the rear fan motor;
a rear vertical air discharge pathway in the vehicle wing, the rear vertical air discharge pathway disposed in pneumatic communication with the rear fan and discharging to the ventral wing surface of the vehicle wing;
a rear horizontal air discharge pathway in the vehicle wing, the rear horizontal air discharge pathway disposed in pneumatic communication with the rear vertical air discharge pathway and discharging at the rear wing edge of the vehicle wing;
a rear diverter slot in the vehicle body adjacent to the rear vertical air discharge pathway;
a rear air diverter disposed between an extended position blocking the rear vertical air discharge pathway and a retracted position in the rear diverter slot and removed from and unblocking the rear vertical air discharge pathway; and
a rear diverter motor operatively engaging the rear air diverter;
a front landing skid protruding from the ventral body surface of the vehicle body;
a pair of spaced-apart rear landing skids protruding from the ventral wing surface of the vehicle wing;
a vertical stabilizer upward-standing from the vehicle wing;
a rudder in the vertical stabilizer;
a rudder control motor operatively engaging the rudder;
a pair of ailerons carried by the vehicle wing;
a pair of pair of aileron control motors operatively engaging the pair of ailerons, respectively; and
a remote control unit configured to remotely control the at least one camera, the front fan motor, the rear fan motor, the front diverter motor and the rear diverter motor.

18. The unmanned aerial vehicle of claim 17 wherein the camera compartment comprises an upper camera housing protruding beyond the dorsal wing surface of the vehicle wing and a lower camera housing protruding beyond the ventral body surface of the vehicle body.

19. The unmanned aerial vehicle of claim 17 further comprising a camera motor operatively engaging the at least one camera for multi-positioning capability of the at least one camera.

20. The unmanned aerial vehicle of claim 17 wherein the front horizontal air discharge pathway comprises a front pathway segment disposed in pneumatic communication with the front vertical air discharge pathway, a pair of curved side pathway segments disposed in pneumatic communication with the front pathway segment on respective sides of the camera compartment and a pair of rear pathway segments disposed in pneumatic communication with the side pathway segments, respectively, and discharging to the rear wing edge of the vehicle wing.

* * * * *